F. C. SCHLINGLOF.
POULTRY ROOST.
APPLICATION FILED SEPT. 27, 1920.

1,422,624.  Patented July 11, 1922.

Witness

Inventor
Frank C. Schlinglof
By Edson Bros.
Attorney

UNITED STATES PATENT OFFICE.

FRANK C. SCHLINGLOF, OF KENTON, OHIO, ASSIGNOR TO THE CORONA MANUFACTURING COMPANY, OF KENTON, OHIO, A CORPORATION OF OHIO.

POULTRY ROOST.

1,422,624.  Specification of Letters Patent.  Patented July 11, 1922.

Application filed September 27, 1920. Serial No. 412,962.

*To all whom it may concern:*

Be it known that I, FRANK C. SCHLINGLOF, a citizen of the United States, residing at Kenton, in the county of Hardin and State of Ohio, have invented certain new and useful Improvements in Poultry Roosts; and I do hereby declare the following to be a full, clear, and exact description of the invention, such as will enable others skilled in the art to which it appertains to make and use the same.

This invention relates to improvements in what may be termed poultry roosts or perches.

The invention has especially for its object to promote sanitary conditions, particularly the extermination of vermin on the fowls as well as their roosting quarters.

A further object is to provide for carrying out this end or purpose in a simple, inexpensive and effective manner and with facility.

Other objects of the invention will be appreciable from the following description of the construction and arrangement thereof.

The invention, therefore, consists of certain instrumentalities and features of construction substantially as hereinafter more fully disclosed and defined by the appended claims:

The accompanying drawing illustrates the preferred embodiment or one form of my invention wherein it will be understood that various changes and modifications as relate to the detailed construction and arrangement of parts may be made without departing from the spirit or scope of my invention as covered by the claims, and in which drawing:

Figure 1:
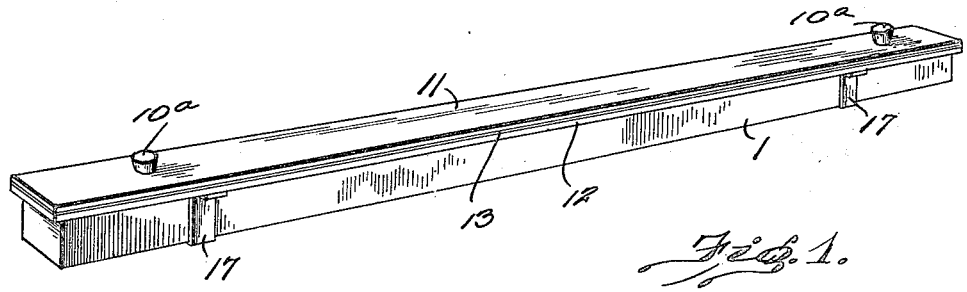
Fig. 1 is a perspective view of my invention.
Figure 2:
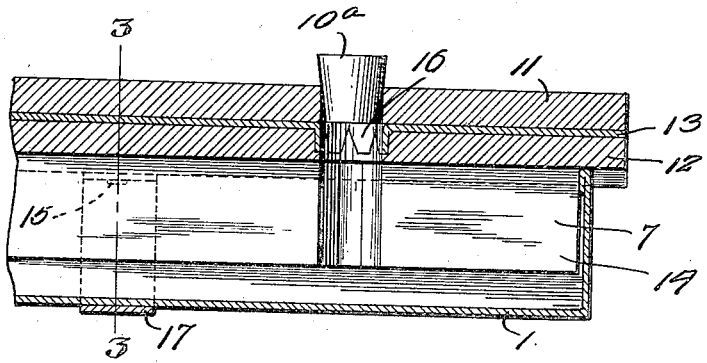
Fig. 2 is a fragmentary sectional view thereof.
Figure 3:
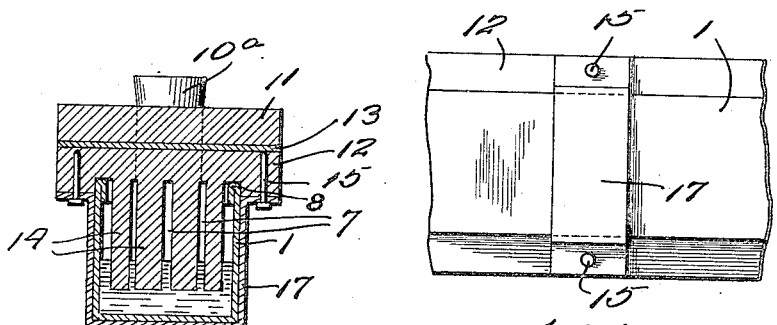
Fig. 3 is a transverse section taken on the line 3—3 of Fig. 2.
Figure 4:
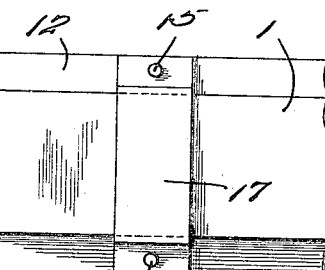
Fig. 4 is a fragmentary inverted view of the device.

As characteristic features of my invention, I provide a metallic trough-like pan or receptacle 1 for holding preferably a disinfectant oil solution of a destructive character to vermin infesting the roosts or perches of poultry or fowls; and in connection with said pan or receptacle I employ a perch or roost 11—12 of peculiar construction as presently disclosed. The pan 1 is suitably supported upon brackets 17.

The perch or roost 11—12, preferably of some relatively soft wood or medium, the capillary action of which may be harnessed (so to speak) or utilized for applying an agent, such as above indicated is designed for destroying or exterminating the vermin, the carrying out of which will be now described. The perch or roost 11—12 has formed upon its under side longitudinal central depending portions 14, these tongues or depending portions 14 having a sufficient submergence within the disinfectant oil solution in the pan 1 for allowing them to take up the disinfectant oil solution for delivery to the perch in controlled or required quantities.

It will be observed that the perch or roost 11—12 has, in addition to having the above described structural characteristics, undercut longitudinal downwardly facing parallel grooves 8 to receive the upper edges of the pan 1, and thus provide for superposing the perch or roost thereon as against lateral displacement from the weight or movement of the fowls or poultry thereon, also that by spacing the tongues or strips 7 from the perch, as above indicated, the capillary action induced thereby is aided by the disinfectant oil solution being allowed to rise or forced into the spaces 7 along the "wick"-like forming members or strips 14, while by stopping the perch above the plane of the lower ends of the members 7 a greater oil-containing capacity is afforded than would be otherwise the case. Also it is further observed that the perch or roost is extended or flanged, as at 11, particularly laterally, which serves for increased or greater distribution of the disinfectant to aid in the effective extermination of the vermin as well as increasing the perching or roosting capacity thereof, and that in making the perch or roost of a fibrous material, as wood, liability of the frosting or freezing the feet of the poultry in wintry weather, as experienced by the use of metal or wire woven fabric for this purpose, is prevented.

The perch is provided with a metallic member or plate 13 interposed between said fibrous or wooden members 11, 12. The purpose of the metallic member or plate 13 is to effectively prevent the passage to and absorption by the poultry upper or foot-rest-member 11, of the oil or solution, which would render the perch damp or uncomfortable to the feet of the fowl and, in wintry weather, render the feet liable to be frozen as has heretofore otherwise been experienced in this connection. The intermediate depending portions, answering to those designated as 14, of the form as above described, are however, all preferably of substantially corresponding longitudinal, and transverse section and interspaced as at 7 and having a suitable submergence into the disinfectant oil-solution. The member 12 is preferably spiked or otherwise secured to the metallic disinfectant-container 1, as at 15, the metallic member or plate 13 being clamped or otherwise held tightly down upon the member 12, it may be by way of an expedient, preferably by forming an orifice in the plate 13 and crimping the lower edge, say of the wall of said orifice, to the wall of the pouring orifice of the roost as at 16, within the oil-solution-pouring passage. The roost or perch structure 11, 12, 13 is now anchored firmly upon the disinfectant or oil solution container by employing stirrup-like strap members 17 or other suitable means.

Having thus described my invention, I claim and desire to secure by Letters Patent:

1. In a device of the type described, the combination of a disinfectant container and a perch adapted to be superposed thereon, said perch having means embedded therein to limit the rising of the oil or disinfectant under the capillary action with respect to the poultry-roosting surface or portion of said perch, and means integral therewith and depending into and adapted to automatically transfer said disinfectant from said container for destroying vermin.

2. In a device of the type described, the combination with a disinfectant container, of a perch adapted to be superposed thereon, said perch having means embedded therein to limit the rising of the oil or disinfectant under the capillary action with respect to the poultry roosting surface of said perch, and means integral therewith and having a constricted depending member adapted to automatically transfer said disinfectant from said container for destroying vermin.

3. A device of the type described, including a disinfectant container and a perch or roost adapted to be mounted upon said container, said roost having means adapted to automatically transfer the disinfectant from said container for destroying vermin, said roost comprising a plurality of fibrous members and a disinfectant interrupter.

4. A device of the type described, including a disinfectant container and a roost adapted to be mounted upon said container and having means adapted to automatically transfer the disinfectant to said roost from said container for destroying vermin, said roost comprising a plurality of fibrous members, with an interposed metallic member between said fibrous members, and having an orifice therein, the walls of said orifice having the lower edges crimped within to the wall of the disinfectant-pouring orifice.

In testimony whereof, I affix my signature.

FRANK C. SCHLINGLOF.

Witnesses:
C. W. FAULKNER,
C. G. PHILLIPS.